(12) United States Patent
Uehara et al.

(10) Patent No.: US 10,322,620 B2
(45) Date of Patent: Jun. 18, 2019

(54) DUAL ZONE VEHICLE AIR CONDITIONING SYSTEM WITH RECIRCULATION CONTROL

(71) Applicant: Nissan North America, Inc., Franklin, TN (US)

(72) Inventors: Takafumi Uehara, Mexico City (MX); Xavier Ramiro, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 574 days.

(21) Appl. No.: 15/009,972

(22) Filed: Jan. 29, 2016

(65) Prior Publication Data

US 2017/0217283 A1    Aug. 3, 2017

(51) Int. Cl.
*B60H 1/00*    (2006.01)
*B60H 1/32*    (2006.01)

(52) U.S. Cl.
CPC ......... *B60H 1/323* (2013.01); *B60H 1/00849* (2013.01); *B60H 2001/00942* (2013.01)

(58) Field of Classification Search
CPC ............... B60H 1/323; B60H 1/00849; B60H 1/00764; B60H 1/00964; B60H 2001/00942; B60H 2001/3266
See application file for complete search history.

(56) References Cited

U.S. PATENT DOCUMENTS

| 4,473,109 | A  | * | 9/1984 | Kojima | B60H 1/00814 165/203 |
| 2004/0074246 | A1 | * | 4/2004 | Kurata | B60H 1/00328 62/196.4 |
| 2012/0077426 | A1 | * | 3/2012 | Dage | B60H 1/00764 454/75 |

* cited by examiner

*Primary Examiner* — Travis C Ruby
(74) *Attorney, Agent, or Firm* — Global IP Counselors, LLP (57) ABSTRACT

A vehicle air conditioning system is configured to cool a passenger compartment having a first zone and a second zone. An air handler has a recirculation door movable from a first position in which only fresh air from outside the vehicle enters the air handler and a second position in which only recirculation air from the first zone enters the air handler. A controller is connected to the first sensor, the recirculation door and a control panel. The controller is configured such that in response to the control panel being set to: provide cooling only to the second zone; the recirculation door being set to provide fresh air; and a first sensor's conditions being meet, the controller changes the setting of the recirculation door from fresh air to recirculated air to the air handler over-riding a manual setting of the position of the recirculation door.

18 Claims, 5 Drawing Sheets

DUAL ZONE VEHICLE AIR CONDITIONING SYSTEM WITH RECIRCULATION CONTROL

BACKGROUND

Field of the Invention

The present invention generally relates to a vehicle dual zone air conditioning system. More specifically, the present invention relates to vehicle dual zone air conditioning system with a first evaporator for a first zone and a second evaporator for a second zone where both first and second evaporators are provided with unimpeded flow of compressed refrigerant from a condenser while the compressor is operating.

Background Information

A vehicle dual zone air conditioning system is typically provided with a first evaporator for a first zone thereof and a second evaporator for a second zone thereof with at least one refrigerant flow shut-off valve installed between a condenser and at least one of the first evaporator and the second evaporator in order to selectively stop the flow of refrigerant to the one of the first and second evaporators.

SUMMARY

One object of the disclosure is to control a dual zone air conditioning system in the absence of a refrigerant flow shut-off valve between a compressor and both a first evaporator of a first zone and a second evaporator zone of a second zone.

In view of the state of the known technology, one aspect of the present disclosure is to provide a vehicle air conditioning system with a vehicle body structure, a first sensor, an air handler, a first evaporator, a second evaporator, a compressor, a condenser, a control panel and a controller. The vehicle body structure defines a passenger compartment having a first zone and a second zone. The first sensor detects a predetermined parameter relative to the vehicle body structure. The air handler has a fresh air inlet positioned to draw fresh air from outside the vehicle body structure, a recirculation inlet positioned to draw air from within the passenger compartment and a recirculation door movable from a first position to a second position such that in the first position only fresh air from outside the vehicle body structure can enter the air handler and in the second position only air from the first zone enters the air handler. The first evaporator has an upstream side with a refrigerant expansion device and a downstream side. The second evaporator has an upstream side with a refrigerant expansion device and a downstream side. The compressor is configured to compress refrigerant received from the downstream side of the first evaporator and the downstream side of the second evaporator. The condenser is connected to the compressor and configured to dissipate heat from compressed refrigerant received from the compressor. The condenser is connected to the expansion device of the first evaporator and the expansion device of the second evaporator supplying an uninterrupted flow of cooled compressed refrigerant to both the first expansion device and the second expansion device while the compressor is operating in the absence of any intervening valve or flow interruption device. The control panel is configured for receiving manually set air conditioning operation settings, including settings for cooling of the first zone, settings for cooling of the second zone and position of the recirculation door. The controller is connected to the first sensor, the compressor, the recirculation door and the control panel. The controller is configured such that in response to the control panel being set to: 1) provide cooling to the second zone; 2) not to provide cooling to the first zone; 3) the recirculation door is set to provide fresh air to the air handler; and 4) the first sensor conditions being meet, the controller changes the setting of the recirculation door to provide recirculated air to the air handler over-riding the manually set air conditioning operation setting of the position of the recirculation door.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
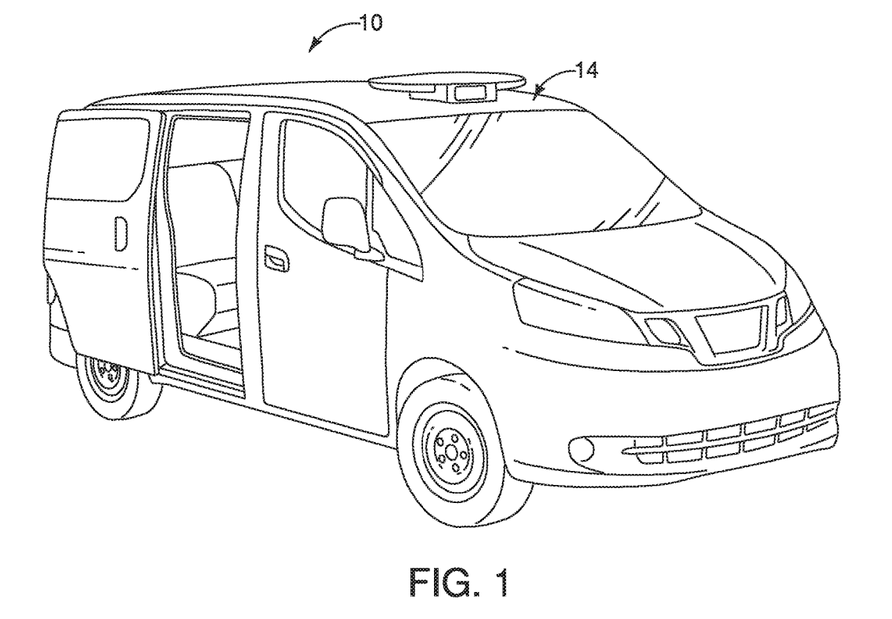
FIG. 1 is a perspective view of a vehicle having a passenger compartment divided into a first zone and a second zone, and a dual zone air conditioning system in accordance with a first embodiment.
Figure 2:
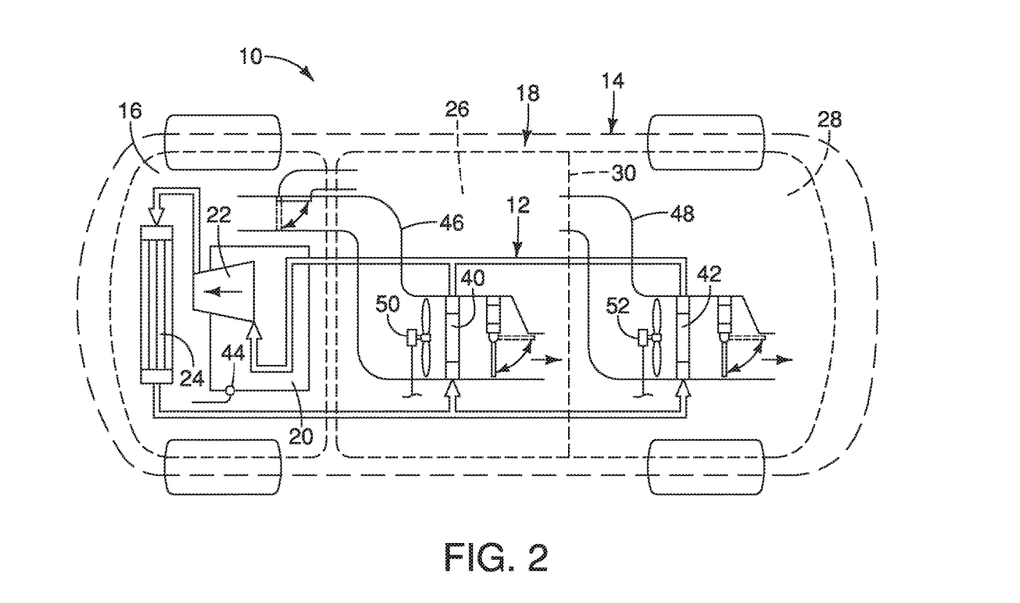
FIG. 2 is a schematic view of the vehicle showing an engine compartment, the first zone of the passenger compartment, the second zone of the passenger compartment and elements of the air conditioning system in accordance with the first embodiment.

Referring initially to FIGS. 1 and 2, a vehicle 10 with an air conditioning system 12 (FIG. 2) with independently operable dual zones is illustrated in accordance with a first embodiment.

As shown in FIG. 2, the vehicle 10 includes a vehicle body structure 14 that defines an engine compartment 16 and a passenger compartment 18. The engine compartment 16 includes a power plant 20, a compressor 22 powered by the power plant 20 and a condenser 24. The power plant 20 can be an electric motor, an internal combustion engine, such as a diesel engine or gasoline powered engine, or a hybrid engine that includes both an electric motor and an internal combustion engine. Since such power plants are conventional features, further description is omitted for the sake of brevity. The compressor 22 and the condenser 24 are part of the air conditioning system 12, which is described in greater detail below.

The passenger compartment 18 is divided into a first zone 26 and a second zone 28 by, for example, a partition 30. The first zone 26 is a forward section of the passenger compartment 18 that includes a front seat or seats (not shown) and operator controls (not shown) such as a steering wheel (not shown), brake and accelerator controls. Since front seat(s) and operator controls of a vehicle are conventional features, further description is omitted for the sake of brevity. The second zone 28 is a passenger section of the passenger compartment 18 rearward from the first zone 26. The passenger compartment 18 is configure for use as, for example, a taxi or limousine where a driver is separated from passengers, where the partition 30 separates the first zone 26 from the second zone 28. Alternatively, the passenger compartment 18 can be conventional vehicle passenger compartment in the absence of the partition 30, where the conventional vehicle includes a dual zone air conditioning such as the air conditioning system 12, as described below.

Figure 3:
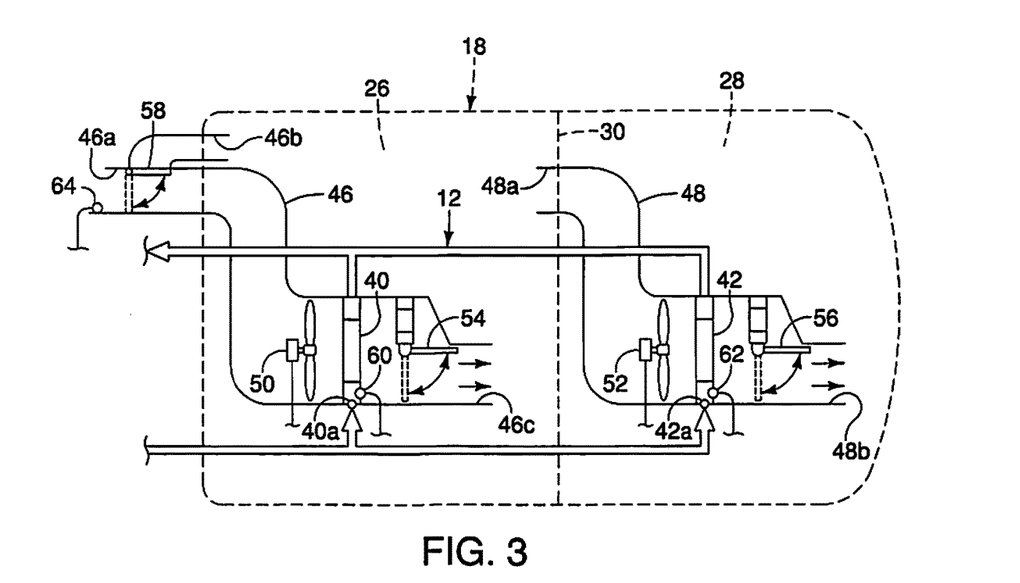
FIG. 3 is a schematic view of a portion of the vehicle and elements of the air conditioning system showing a first air handler with a first evaporator and a recirculation door, a second handler with a second evaporator in accordance with the first embodiment.
Figure 4:
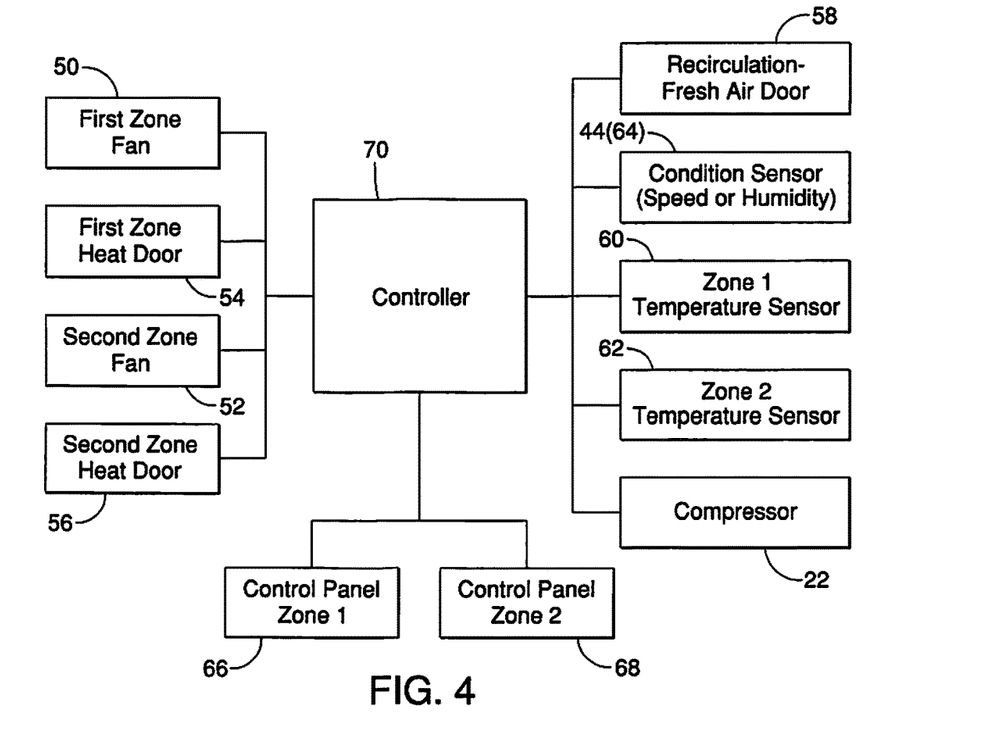
FIG. 4 is a block diagram showing various elements of the air conditioning system depicted in FIG. 3, including a controller in accordance with the first embodiment.

The air conditioning system 12 is shown in FIGS. 2, 3 and 4, and includes the compressor 22, the condenser 24, a first evaporator 40 (for the first zone 26), a second evaporator 42 (the second zone 28), a speed sensor 44 (a condition sensor), a first air handler 46 (the first zone 26), a second air handler 48 (the second zone 28), a first fan 50, a second fan 52, a first heat door 54 (the first air handler 46), a second heat door 56 (the second air handler 48), a recirculation door 58 (the first air handler 46), a first temperature sensor 60, a second temperature sensor 62, a humidity sensor 64, a first control panel 66, a second control panel 68 and a controller 70.

As shown in FIG. 2, the compressor 22 is located in the engine compartment 16 and is provided with power by the power plant 20 in a conventional manner. The compressor 22 is configured to compress refrigerant received from a downstream side of the first evaporator 40 and a downstream side of the second evaporator 42. The compressor 22 is connected to the condenser 24 provide compressed refrigerant to the condenser 24. The condenser 24 is installed within the engine compartment 16 in order to dissipate heat produced by the compressing of refrigerant by the compressor 22. The first evaporator 40 has an upstream side with a refrigerant expansion device 40a integrated therein. The second evaporator 42 has an upstream side with a refrigerant expansion device 42a integrated therein. The refrigerant expansion devices 40a and 42a are preferably automatic devices that automatically release compressed refrigerant into the first and second evaporators 40 and 42 at a pressure that is lower than the pressure exiting the condenser 24.

It should be understood from the drawings and description herein that the refrigerant expansion devices 40a and 42a are not valves per se, and can be, for example, orifice tubes. Specifically, the refrigerant expansion devices 40a and 42a are refrigerant flow restricting devices and are not configured to completely stop the flow of refrigerant. Rather, the refrigerant expansion devices 40a and 42a are refrigerant flow restriction devices that limit flow of refrigerant without stopping the flow of refrigerant, such that pressure on an upstream side of each of the refrigerant expansion devices 40a and 42a is greater than the refrigerant pressure on a downstream side of the refrigerant expansion devices 40a and 42a. Since expansion devices are conventional features of air conditioning systems, further description is omitted for the sake of brevity.

Refrigerant from the condenser 24 is directly fed to each of the first evaporator 40 and the second evaporator 42. More specifically, the condenser 24 is directly connected to the expansion device 40a and the expansion device 42a in order to supply an uninterrupted flow of cooled compressed refrigerant to both the first expansion device 40a and the second expansion device 42a while the compressor 22 is operating in the absence of any intervening valve or flow interruption device. In other words, refrigerant is provided to both the first evaporator 40 and the second evaporator 42 at all times from the condenser 24 during operation of the compressor 22. Similarly, refrigerant leaving each of the first and second evaporators 40 and 42 is provided uninterrupted to the compressor 22 (in the absence of any mechanical valve or refrigerant flow shut off device).

The first evaporator 40 (for the first zone 26) is disposed within the first air handler 46 in a conventional manner, along with the first fan 50, a heater core, and the first heat door 54. The first air handler 46 has a fresh air inlet 46a, a recirculation air inlet 46b and an outlet 46c. The fresh air inlet 46a is positioned to draw in fresh air from outside the vehicle 10. The recirculation air inlet 46b is positioned to draw air into the first air handler 46 from the passenger compartment 18. In the depicted embodiment, the recirculation air inlet 46b draws air into the first air handler 46 from the first zone 26 of the passenger compartment 18. The outlet 46c is positioned to expel air from the first air handler 46 into the first zone 26 of the passenger compartment 18. The recirculation door 58 is a remotely controlled door that moves between two positions. In a first position shown (also referred to as a fresh air position) in solid lines in FIG. 3, the recirculation door 58 blocks the recirculation air inlet 46b such that only fresh air is drawn into the first air handler 46 via the fresh air inlet 46a. In a second position (also referred to as a recirculation position) shown in dashed lines in FIG. 3, the recirculation door 58 blocks the fresh air inlet 46a such that air is drawn into the first air handler 46 via the recirculation air inlet 46b from the passenger compartment 18.

The first air handler 46 also includes the first temperature sensor 60. In the depicted embodiment in FIG. 3, the first temperature sensor 60 is installed on a downstream side of the first evaporator 40. However, the first temperature sensor 60 can alternatively be installed within the first air handler 46 downstream side of and spaced apart from the first evaporator 40. The first temperature sensor 60 can be configured to measure the temperature of the air cooled by the first evaporator 40 as the cooled air is blown by the first fan 50 into the first zone 26 of the passenger compartment 18. Alternatively, the first temperature sensor 60 can be configured to measure the temperature of the first evaporator 40.

The second evaporator 42 (for the second zone 28) is disposed within the second air handler 48 in a conventional manner, along with the second fan 52, a second heater core, and the second heat door 56. The second air handler 48 has an air inlet 48a and an outlet 48b. The air inlet 48a is positioned to draw in air from first zone 26 of the passenger compartment 18. The outlet 48*b* is positioned to expel air from the second air handler 48 into the second zone 28 of the passenger compartment 18.

The second air handler 48 also includes the second temperature sensor 62. In the depicted embodiment in FIG. 3, the second temperature sensor 62 is installed on a downstream side of the second evaporator 42. However, the second temperature sensor 62 can alternatively be installed within the second air handler 48 downstream side of and spaced apart from the second evaporator 42. The second temperature sensor 62 is configured to measure the temperature of the air cooled by the second evaporator 42 as the cooled air is blown by the second fan 52 into the second zone 28 of the passenger compartment 18. Alternatively, the second temperature sensor 62 can be configured to measure the temperature of the second evaporator 42.

The structure and operation of the first and second heat doors 54 and 56 are conventional. Therefore, operation of first and second heat doors 54 and 56 and corresponding heater cores is omitted for the sake of brevity.

The air conditioning system 12 also includes at least one (or alternatively, both) the speed sensor 44 (a first sensor) and the humidity sensor 64 (a first sensor). The speed sensor 44 is connected to the power plant 20 and/or drive train (not shown) of the vehicle 10, such that the speed sensor 44 provided detected vehicle speed to the controller 70 in a manner described in greater detail below. The humidity sensor 64 is installed to the air inlet 46*a* of the first air handler 46 such that the humidity sensor 64 can measure or detect the level of moisture in air entering the first air handler 46. It should be understood from the drawings and the description herein that the humidity sensor 64 can be within the first air handler 46, or outside of the first air handler 46, so long as the humidity sensor 64 is positioned to make accurate measurements of the level of humidity (moisture content) of fresh air outside of the vehicle 10. The humidity sensor 64 is further connected to the controller 70 providing signals indicating the level of moisture (humidity levels) in air entering the first air handler 46, in a manner described in greater detail below.

As shown in FIG. 4, the first control panel 66 and the second control panel 68 are connected to the controller 70. The first control panel 66 is located within the first zone 26 of the passenger compartment 18 and includes conventional mechanisms and/or electronic hardware configured to receive heat and air conditioning settings manually set by a vehicle operator and/or vehicle passenger in the first zone 26. The second control panel 66 can be located within the second zone 28 of the passenger compartment 18 and includes conventional mechanisms and/or electronic hardware configured to receive heat and air conditioning settings manually set by a vehicle passenger in the second zone 28. Alternatively, the second control panel 68 can be located in the first zone 26 such that only the vehicle operator can change the settings of heat and air conditioning of the second zone 28. In a further alternative configuration, the first and second control panels 66 and 68 can be configured as a single control panel located within the first zone 26, but configured to change heat and air conditioning settings for both the first zone 26 and the second zone 28.

The first control panel 66 and the second control panel 68 are configured to receive manually inputted of respective settings for heating and cooling of the first zone 26 and the second zone 28. For instance, the first and second control panels 66 and 68 each include switches and/or electronic panels that allow a passenger to set speeds of the first fan 50 and the second fan 52; select a heat mode or a cooling mode for respective ones of the first zone 26 and the second zone 28; set temperatures for heating and cooling settings of respective ones of the first zone 26 and the second zone 28; and also configured to allow the vehicle operator and/or passengers to select operation in a recirculated air setting (recirculated air re-entering the passenger compartment 18) or a fresh air mode (fresh air entering the passenger compartment 18). In other words, the first and second control panels 66 and 68 are used to set the position of the recirculation door 58.

As mentioned above and shown in FIG. 4, the controller 70 is connected to at least one, or both of the speed sensor 44, the humidity sensor 64 and the first and second temperature sensors 60 and 62. Each of these sensors can constitute a first sensor that detects a predetermined parameter relative to the vehicle body structure 14, as is described in greater detail below.

Specifically, the controller 70 is configured to over-ride settings made by passenger(s) relating to the position of the recirculation door 58, as inputted via the first control panel 66 and/or second control panel 68 when, for example, four conditions are met. The first three conditions are met when settings made via the first control panel 66 and/or second control panel 68 meet predetermined criteria. The fourth condition is based on readings from one or more of the above mentioned first sensors.

Specifically, the controller 70 determines the status of the following settings and conditions such that in response to the first and second control panels 66 and 68 being set to: 1) provide cooling to the second zone 28; 2) not to provide cooling to the first zone 26; and 3) the recirculation door 58 being set to provide fresh air to the first air handler 46, the controller 70 further looks to parameters of the first sensor. If at least these first three conditions are met, and parameters of the first sensor are met, then the controller 70 changes the setting of the recirculation door 58 to provide recirculated air to the first air handler 46 over-riding the manually set position of the recirculation door 58 as previously inputted via one of the first and second control panels 66 and 68. Additionally, the controller 70 can also consider the status of the first fan 50. Specifically, the controller 70 can additionally include a requirement that the first fan 50 within the first air handler 46 be set to a speed of zero (off) in order to over-ride the manually set position of the recirculation door 58 and moving it to the recirculation position.

Figure 5:
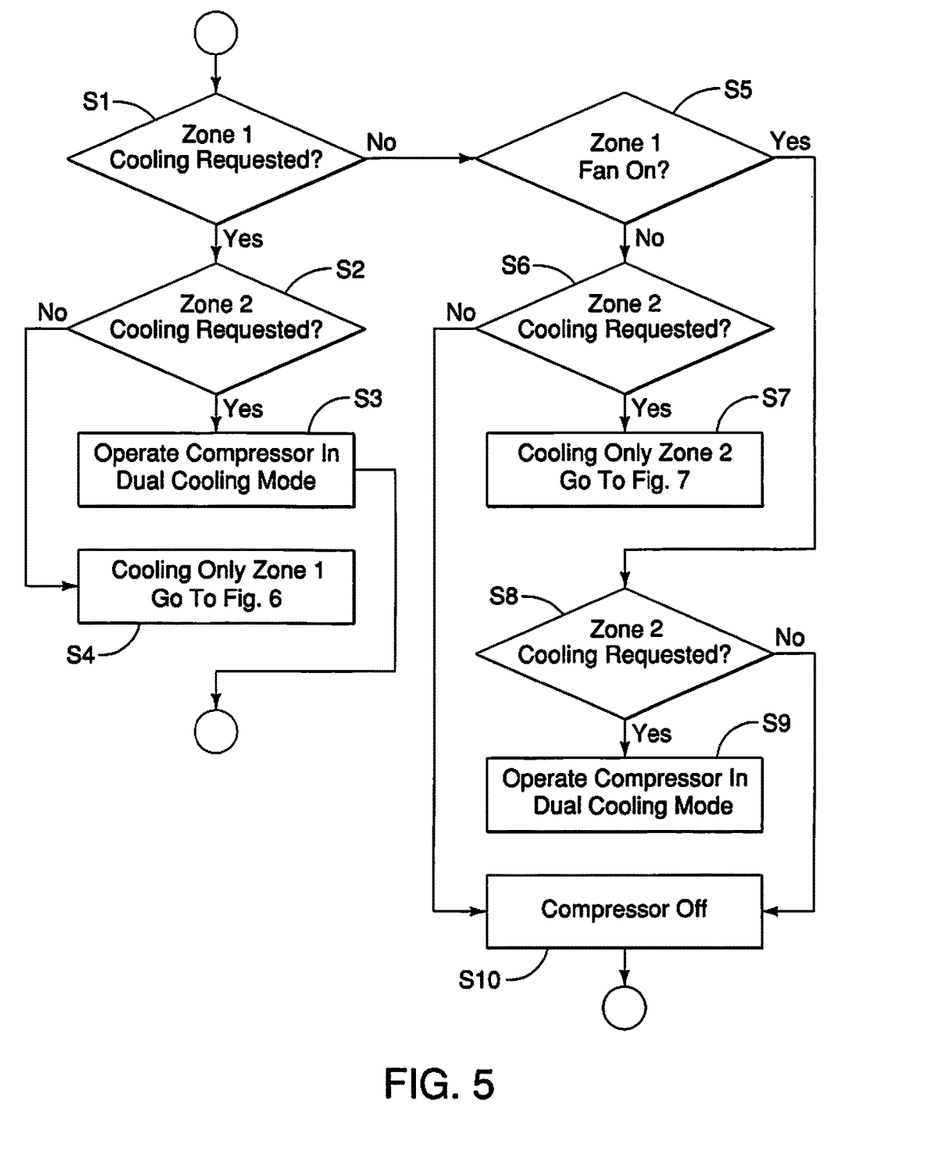
FIG. 5 is a first flowchart showing a logic steps conducted by the controller in the operation of the air conditioning system in accordance with the first embodiment.
Figure 6:
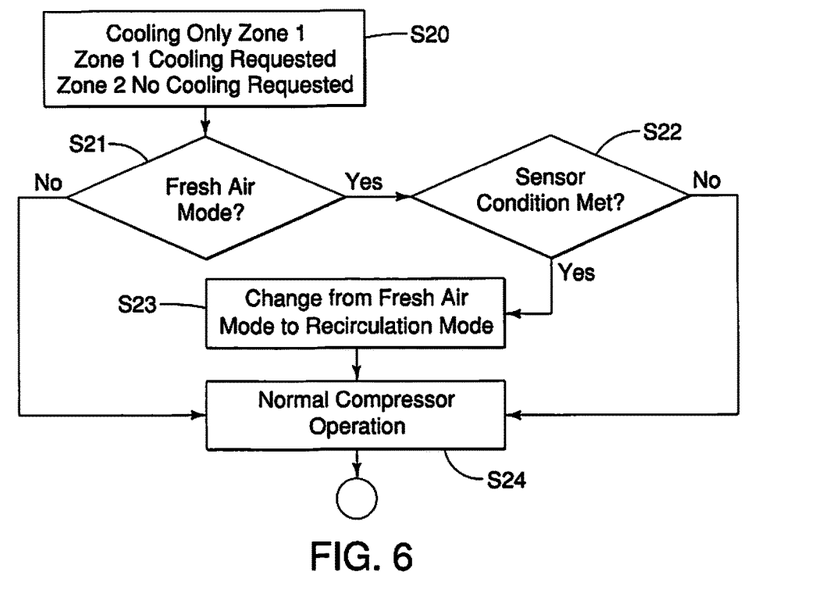
FIG. 6 is a second flowchart showing further logic steps conducted by the controller in the operation of the air conditioning system in accordance with the first embodiment.
Figure 7:
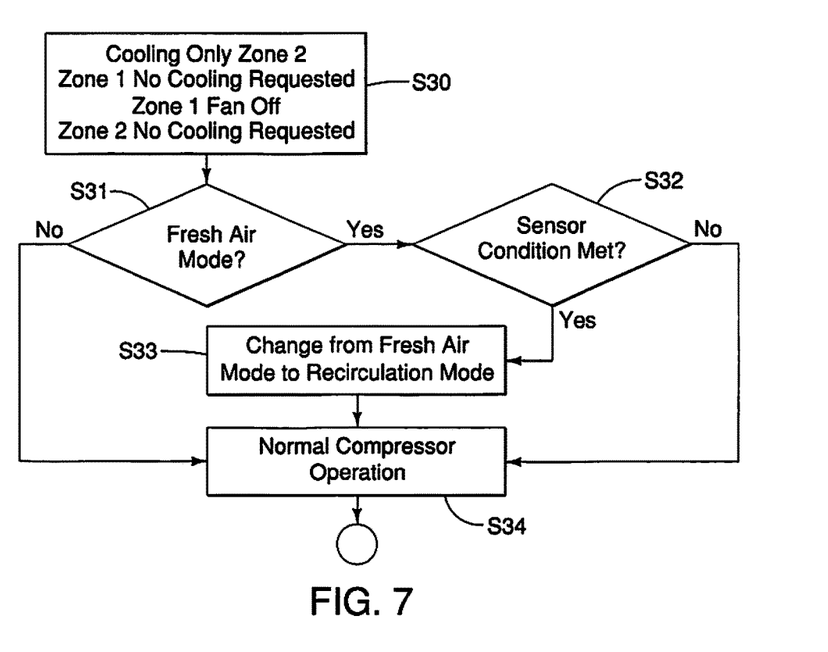
FIG. 7 is a third flowchart showing still further logic steps conducted by the controller in the operation of the air conditioning system in accordance with the first embodiment.

A description of operation of the controller 70 is provided with respect to FIGS. 5, 6 and 7. Prior to description of the operations in FIGS. 5, 6 and 7, a further description of signals of the first sensor used by the controller 70 are described.

First Embodiment Configurations

In the first embodiment, there are three alternative configurations relating to the conditions met by the first sensor.

Speed Sensor 44 Defines First Sensor

In a first configuration of the first embodiment, the controller 70 defines the first sensor as being the speed sensor 44. The controller 70 uses signals from the speed sensor 44 as one of the conditions to determine whether or not to change the position of the recirculation door 58. Specifically, if the speed sensor 44 detects that the vehicle 10 is moving (vehicle speed greater than zero), then the conditions of the first sensor are met.

The speed of the vehicle 10 is a factor considered by the controller 70 in the first embodiment in a high humidity environment. When cooling has been requested in the second zone 28, but no cooling is desired or requested in the first zone 26, and the first fan 50 is off, the movement of the vehicle 10 with the recirculation door 58 in the fresh air position causes the humid fresh air to flow through the first air handler 46 and past cooling surfaces of the first evaporator 40. In order to limit or prevent formation of frozen moisture on the surfaces of the first evaporator 40, the controller 70 moves the recirculation door 58 to the recirculation position in order to prevent fresh moist air from passing into the first air handler 46 in response to determining the conditions mentioned above are met, and additionally determining that the vehicle 10 is in motion.

Humidity Sensor 64 Defines First Sensor

In a second configuration of the first embodiment, the controller 70 defines the first sensor as being the humidity sensor 64. The controller 70 uses signals from the humidity sensor 64 as one of the conditions to determine whether or not to change the position of the recirculation door 58. Specifically, if the humidity sensor 64 detects that humidity of fresh air outside the vehicle 10 is above a predetermined level, such as, for example 65% relative humidity or greater, 75% relative humidity or greater, then the conditions of the first sensor are met.

The humidity of fresh air outside the vehicle 10 is a factor considered by the controller 70 in the second configuration of the first embodiment. When cooling has been requested in the second zone 28, but no cooling is desired or requested in the first zone 26, and the first fan 50 is off, the movement of the vehicle 10 with the recirculation door 58 in the fresh air position causes fresh air to flow through the first air handler 46 and past cooling surfaces of the first evaporator 40.

In order to limit or prevent formation of frozen moisture on the surfaces of the first evaporator 40, the controller 70 moves the recirculation door 58 to the recirculation position in order to prevent fresh moist air from passing into the first air handler 46 in response to determining the first three conditions mentioned above, and additionally determine that the humidity levels of the fresh air at the first air handler 46 are greater than the predetermined amount.

Temperature Sensors 60 and 62 Define First Sensor

In a third configuration of the first embodiment, the controller 70 defines the first sensor as being the first and second temperature sensors 60 and 62. The controller 70 uses signals from the first and second temperature sensors 60 and 62 as one of the conditions to determine whether or not to change the position of the recirculation door 58. Specifically, if the first and second temperature sensors 60 and 62 are such that the temperature measured by the second temperature sensors 60 is greater than the temperature measured by the first temperature sensor 60 by, for example, a temperature differential greater than 5 degrees C., then the conditions of the first sensor are met.

The difference in temperature between the first and second evaporators 40 and 42 and/or the difference in temperature between air within the first and second air handlers 46 and 48 is a factor considered by the controller 70 in the third configuration of the first embodiment. When cooling has been requested in the second zone 28, but no cooling is desired or requested in the first zone 26, and the first fan 50 is off, the movement of air with the recirculation door 58 in the fresh air position causes fresh air to flow through the first air handler 46 and past cooling surfaces of the first evaporator 40.

In order to limit or prevent formation of frozen moisture on the surfaces of the first evaporator 40, the controller 70 moves the recirculation door 58 to the recirculation position in order to prevent fresh moist air from passing into the first air handler 46 in response to determining the first three conditions mentioned above, and additionally determine that a temperature deferential between the first evaporator 40 and the second evaporator 42, and/or a temperature differential between air within the first air handler 46 and the second air handler 48 is greater than a predetermined level.

The operation of the controller 70 to over-ride the manually set position of the recirculation door 58 from the fresh air position to the recirculation position is advantageous in the air conditioning system 12 due to the absence of a refrigerant flow shut-off valve between the condenser 24 and the first and second evaporators 40 and 42. Specifically, the cost of manufacturing and maintaining the air conditioning system 12 can be reduced by omitting a refrigerant flow shut-off valve between the condenser 24 and the first and second evaporators 40 and 42. Since there is one less mechanical component in the air conditioning system 12, there is one less mechanical component to manufacture and one less mechanical component to repair in the event of mal-function.

Description of Flowcharts

A description of one example of control logic used by the controller 70 is now provided with specific reference to FIGS. 5, 6 and 7. For the sake of simplicity, in the description below, all descriptions regarding the controller 70 determining whether or not a request for cooling of the second zone 28 has been set, include that cooling has been requested or set via one of the first and second control panels 66 and 68, and that the second fan 52 has been set to operate and blow air through the second air handler 48. However, the descriptions below regarding determining whether or not a request for cooling of the first zone 26 has been set, is considered by the controller 70 as being separate from whether or not the first fan 50 has been set to operate and blow air through the first air handler 46.

In FIG. 5 at step S1, the controller 70 determines whether or not cooling has been requested or set using one of the first control panel 66 and the second control panel 68 for the first zone 26. If cooling has been requested for the first zone 26, then operation moves to step S2. If cooling has not been requested for the first zone 26, then operation moves to step S5.

At step S2, the controller 70 determines whether or not cooling has been requested or set using one of the first control panel 66 and the second control panel 68 for the second zone 28. If cooling has been requested for the second zone 28, then operation moves to step S3. If cooling has not been requested for the second zone 28, then operation moves to step S4.

At step S3, since the controller 70 has determined that cooling has been requested for both the first zone 26 and the second zone 28, the air conditioning system 12 operates in a dual cooling mode. In the dual cooling mode, the operation of the compressor 22 is based upon the temperatures measured by the first temperature sensor 60 and the second temperature sensor 62.

Specifically, the operation of the compressor 22 is determined by the temperature of the warmer of the two temperatures measured by the first temperature sensor 60 and the second temperature sensor 62. Specifically, if the first temperature sensor 60 measures a temperature greater than the second temperature sensor 62, the measurements of the first temperature sensor 60 are used as a system temperature $T_S$. If the first temperature sensor 60 measures a temperature lower than the second temperature sensor 62, the measurements of the second temperature sensor 62 are used as a system temperature $T_S$. If the defined system temperature $T_S$ is greater than a predetermined evaporator cold parameter $T_E$ (a temperature predetermined as an optimal operating temperature for the first and second evaporators 40 and 42), then the controller 70 engages the compressor 22 to compress refrigerant. If the defined system temperature $T_S$ is below the predetermined evaporator cold parameter $T_E$, then the controller 70 dis-engages the compressor 22 so that it ceases compression of refrigerant. The controller 70 operates the air conditioning system 12 in the dual cooling mode until the controller 70 determines at steps S1 and S2 that the cooling request settings have been changed by a passenger or vehicle operator.

At step S4, in response to the controller 70 determining that the first zone 26 is to be cooled and the second zone 28 is not to be cooled, the controller 70 moves to the logic steps shown in FIG. 6, as is described in greater detail below after completion of the description of the logic steps shown in FIG. 5.

At step S5, the controller 70 determines whether or not the first fan 50 is set to operate at any of a plurality of speeds (other than zero or off). In other words, the first fan 50 has been set by a passenger or the vehicle operator to move air through the air handler 46 and into the first zone 26. If the first fan 50 is on and blowing air, operation moves to step S8. If the first fan 50 is off and not blowing air, then the controller 70 moves to step S6.

At step S6, the controller 70 determines whether or not cooling has been requested or set using one of the first control panel 66 and the second control panel 68 for the second zone 28. If cooling has not been requested for the second zone 28, then operation moves to step S10, where the controller 70 ceases cycling operation of the compressor 22. If cooling has been requested for the second zone 28, then operation moves to step S7.

At step S7, in response to the controller 70 determining that the first zone 26 is to not be cooled and the second zone 28 is to be cooled, the controller 70 moves to the logic steps shown in FIG. 7, as is described in greater detail below after completion of the description of the logic steps shown in FIG. 5.

At step S8, the controller 70 determines whether or not cooling has been requested or set using one of the first control panel 66 and the second control panel 68 for the second zone 28. If cooling has not been requested for the second zone 28, then operation moves to step S10, where the controller 70 ceases cycling operation of the compressor 22. If cooling has been requested for the second zone 28, then operation moves to step S9. In step S9, the controller 70 basically operates the air conditioning system 12 in the dual cooling mode, as described above with respect to step S3. Since the first fan 50 is operating, there is no need to move the recirculation door 58 as air is flowing through the first evaporator 40. It is assumed that, since there has been no request for cooling of the first zone 26 and the first fan 50 is operating, the vehicle operator has opened a window of the vehicle 10 such that fresh air is entering the first zone 26 of the passenger compartment 18 through the window. Therefore, even though refrigerant is flowing to the first evaporator 40, the effects of cooling will not impact the vehicle operator, while the passenger(s) in the second zone 28 can benefit from cooling.

A description of the logic depicted in FIG. 6 is now provided. As per the logic in FIG. 5, at step S20, the controller 70 has already determined that only the first zone 26 is to be provided with cooling. Specifically, cooling for the first zone 26 has been requested and cooling for the second zone 28 has not been requested.

The controller 70 immediately moves to step S21 where the controller 70 determines the status of the recirculation door 58. At step S21, if the recirculation door 58 is set to provide fresh air into the first air handler 46, then operation moves to step S22. At step S21, if the recirculation door 58 is set to provide recirculated air from the passenger compartment 18 into the first air handler 46, then operation moves to step S24.

At step S22, the controller 70 determines whether or not the first sensor condition (described above) is met. If the first sensor condition is met, then operation moves to step S23. If the first sensor condition is not met, then operation moves to step S24.

At step S23, the controller 70 changes the position of the recirculation door 58 to provide recirculated air from the passenger compartment 18 into the first air handler 46 in order to minimize or prevent formation of frozen moisture on the second evaporator 42, since it is assumed that the second fan 52 is either operating at a low speed or is turned off, as it is also assumed that the passenger in the second zone 28 has opened a window allowing fresh air to flow into the second zone 28.

At step S24, the controller 70 cycles the compressor 22 on and off based upon the greater of the temperatures measured by the first temperature sensor 60 and the second temperature sensor 62. This operation continues until the controller 70 detects a change in the settings of the first and second control panels 66 and 68, as described above with respect to the logic presented in FIG. 5.

A description of the logic depicted in FIG. 7 is now provided. As per the logic in FIG. 5, at step S30, the controller 70 has already determined that only the second zone 28 is to be provided with cooling. Specifically, cooling for the second zone 28 has been requested and cooling for the first zone 26 has not been requested. Further, the first fan 50 is determined to be off and not blowing air through the first air handler 46. The controller 70 immediately moves to step S31 where the controller 70 determines the status of the recirculation door 58. At step S31, if the recirculation door 58 is set to provide fresh air into the first air handler 46, then operation moves to step S32. At step S31, if the recirculation door 58 is set to provide recirculated air from the passenger compartment 18 into the first air handler 46, then operation moves to step S34.

At step S32, the controller 70 determines whether or not the first sensor condition (described above) is met. If the first sensor condition is met, then operation moves to step S33. If the first sensor condition is not met, then operation moves to step S34.

At step S33, the controller 70 changes the position of the recirculation door 58 to provide recirculated air from the passenger compartment 18 into the first air handler 46 in order to minimize or prevent formation of frozen moisture on the first evaporator 40, since the first fan 50 is not operating (off), as it is also assumed that the vehicle operator in the first zone 26 has opened a window allowing fresh air to flow into the first zone 26.

At step S34, the controller 70 cycles the compressor 22 on and off based upon the greater of the temperatures measured by the first temperature sensor 60 and the second temperature sensor 62. This operation continues until the controller 70 detects a change in the settings of the first and second control panels 66 and 68, as described above with respect to the logic presented in FIG. 5.

The re-positioning of the recirculation door 58 to move from the fresh air position to the recirculating position greatly reduces the flow of moisture filed air over the cooling surfaces of the first evaporator 40, thereby reducing the possibility of moisture condensing an freezing on surfaces of the first evaporator 40, since no cooling has been requested and the first fan 50 is off. This action by the controller 70 over-rides the setting inputted to the first and second control panels 66 and 68 for fresh air into the air handler 46.

The vehicle 10 is primarily configured for use as a taxi. Vehicle operators driving a taxi, often do not desire or want to be cooled by the air conditioning system 12. However, passengers riding in the second zone 28 of the vehicle 10 (a taxi), usually want cooling on a hot day. There is no refrigerant flow valve that can restrict refrigerant flow to either of the first and second evaporators 40 and 42. Specifically, the first and second evaporators 40 and 42 are simultaneously and equally provided with a flow of compressed refrigerant from the condenser 24. The logic presented in FIGS. 5, 6 and 7 provides a simple way to prevent moisture and ice build-up on either one of the first and second evaporators 40 and 42, when only one of the first and second evaporators 40 and 42 is needed to provide cooling. Further, since there is no refrigerant flow valve that can restrict refrigerant flow to either of the first and second evaporators 40 and 42, cost of manufacturing is reduced and there is one less mechanical component of the air conditioning system 12 to maintain and repair.

Hence, the air conditioner 12 is able to operate such that the condenser 24 is connected to the expansion device 40a of the first evaporator 40 and the expansion device 42a of the second evaporator 42 supplying an uninterrupted flow of cooled compressed refrigerant to both the first expansion device 40a and the second expansion device 42a while the compressor 22 is operating in the absence of any intervening valve or flow interruption device.

Second Embodiment

Figure 8:
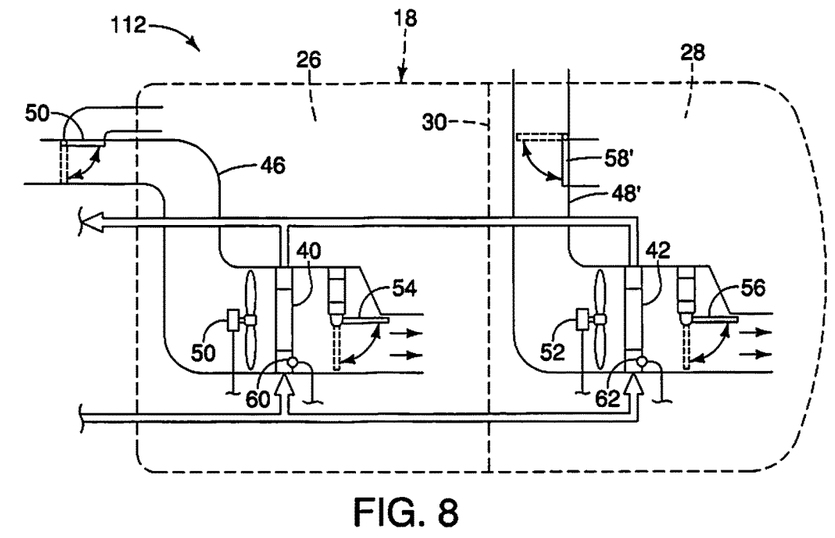
FIG. 8 is a schematic view of a vehicle showing an engine compartment, a first zone of the passenger compartment, a second zone of the passenger compartment and elements of an air conditioning system in accordance with a second embodiment.
Figure 9:
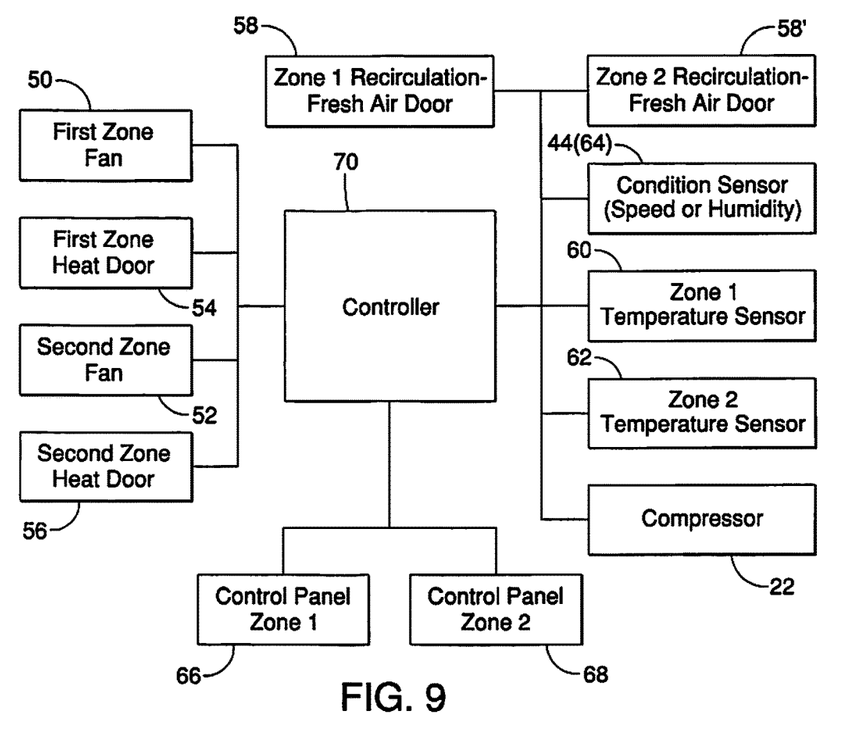
FIG. 9 is a block diagram showing various elements of the air conditioning system depicted in FIG. 8, including a controller in accordance with the second embodiment.

Referring now to FIGS. 8 and 9, an air conditioning system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment or are in addition to parts of the first embodiment will be indicated with a single prime (').

In the second embodiment, the second air handler 48 has been replaced with a second air handler 48' that has an inlet that draws fresh air into the second air handler 48' from outside the vehicle body structure 14 and a recirculation inlet that draws air from within the second zone 28. Additionally, the second air handler 48' includes a second recirculation door 58' that can move between a recirculation position (in dashed lines in FIG. 8) and a fresh air position (solid lines in FIG. 8). In the fresh air position, the second recirculation door 58' causes the second fan 52 to draw fresh air from outside the vehicle 10 into the second air handler 48'. In the recirculation position, the second recirculation door 58' causes the second fan 52 to draw recycled air from the second zone 28 into the second air handler 48'. Otherwise, the second air handler 48' has all of the elements of the second air handler 48 of the first embodiment.

As with the first embodiment, the air conditioner 112 operates such that the condenser 24 is connected to the expansion device 40a of the first evaporator 40 and the expansion device 42a of the second evaporator 42 supplying an uninterrupted flow of cooled compressed refrigerant to both the first expansion device 40a and the second expansion device 42a while the compressor 22 is operating in the absence of any intervening valve or flow interruption device.

Operation by the controller 70 is simplified in the second embodiment. Specifically, when the first zone 26 is such that no cooling is set or requested and the first fan 50 is off, and cooling has been requested in the second zone 28, the controller 70 moves the recirculation door 58 to the recirculation position even over-riding a fresh air setting. Ice build-up on the first evaporator 40 can therefore be minimized or prevented in high humidity conditions.

Similarly, when the second zone 28 is set such that no cooling is set or requested and the second fan 52 is off, and cooling has been requested in the first zone 26, the controller 70 moves the second recirculation door 58' to the recirculation position over-riding a fresh air setting. Ice build-up on the second evaporator 42 can therefore be minimized or prevented in high humidity conditions.

The controller 70 preferably includes a microcomputer with an air conditioning control program that controls the air conditioning systems 12 and 112. The controller 70 can also include other conventional components such as an input interface circuit, an output interface circuit, and storage devices such as a ROM (Read Only Memory) device and a RAM (Random Access Memory) device. The microcomputer of the controller 70 is programmed to control the air conditioning systems 12 and 112. The controller 70 is operatively coupled to the various elements of the air conditioning systems 12 and 112 in a conventional manner. It will be apparent to those skilled in the art from this disclosure that the precise structure and algorithms for the controller 70 can be any combination of hardware and software that will carry out the functions of the present invention.

The various vehicle features are conventional components that are well known in the art. Since such vehicle related features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle air conditioning system. Accordingly, these terms, as utilized to describe the present invention should be interpreted relative to a vehicle equipped with the vehicle air conditioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle air conditioning system, comprising:
   a vehicle body structure defining a passenger compartment having a first zone and a second zone, the first zone being a forward portion of the passenger compartment and the second zone being a rearward portion of the passenger compartment behind the first zone;
   an air handler having a fresh air inlet positioned to draw fresh air from outside the vehicle body structure, a recirculation inlet positioned to draw air from within the passenger compartment and a recirculation door movable from a first position to a second position such that in the first position only fresh air from outside the vehicle body structure can enter the air handler and in the second position only air from the first zone enters the air handler;
   a first evaporator having an upstream side with a refrigerant expansion device and a downstream side;
   a second evaporator having an upstream side with a refrigerant expansion device and a downstream side;
   a first sensor that detects a predetermined parameter relative to the vehicle body structure, the first sensor being selected from one of the following: a vehicle speed sensor configured to detect speed of the vehicle body structure, a humidity sensor configured to detect humidity of air outside of the passenger compartment and a sensor configured to detect refrigerant temperature proximate at least one of the first evaporator and the second evaporator;
   a compressor configured to compress refrigerant received from the downstream side of the first evaporator and the downstream side of the second evaporator;
   a condenser connected to the compressor configured to dissipate heat from compressed refrigerant received from the compressor, the condenser being connected to the expansion device of the first evaporator and the expansion device of the second evaporator supplying an uninterrupted flow of cooled compressed refrigerant to both the first expansion device and the second expansion device while the compressor is operating in the absence of any intervening valve or flow interruption device;
   a control panel configured for receiving manually set air conditioning operation settings, including: a setting for cooling both the first zone and the second zone; a setting for cooling of only the first zone and not the second zone; a setting for cooling of only the second zone and not the first zone, and, settings for a plurality of positions of the recirculation door; and
   a controller connected to the first sensor, the compressor, the recirculation door and the control panel, the controller being configured such that in response to the control panel being set to provide cooling to only the second zone and not the first zone, the recirculation door being set to provide fresh air to the air handler and the first sensor conditions being meet, the controller changes the setting of the recirculation door to provide recirculated air only to the air handler over-riding the manually set air conditioning operation setting of the position of the recirculation door.

2. The vehicle air conditioning system according to claim 1, wherein
   the first sensor detects vehicle speed of the vehicle body structure, and
   the controller is configured to monitor signals from the first sensor such that the first sensor conditions are meet when the vehicle speed is above a predetermined threshold.

3. The vehicle air conditioning system according to claim 1, wherein
   the first sensor detects the humidity of the fresh air entering the air handler, and
   the controller is configured to monitor signals from the first sensor such that the first sensor conditions are meet when the humidity is above a predetermined threshold.

4. The vehicle air conditioning system according to claim 1, wherein
   the first zone is a portion of the passenger compartment that includes a vehicle operators area, and the second zone is a portion of the passenger compartment for passengers.

5. The vehicle air conditioning system according to claim 4, wherein
   the vehicle body structure includes a partition separating the first zone from the second zone.

6. The vehicle air conditioning system according to claim 4, further comprising a second air handler having an inlet that draws air from the first zone and an outlet configured to provide air to the second zone, with the second evaporator being located within the second air handler.

7. The vehicle air conditioning system according to claim 4, further comprising
a second air handler having an inlet that draws air from outside the vehicle body structure and an outlet configured to provide air to the second zone, with the second evaporator being located within the second air handler.

8. The vehicle air conditioning system according to claim 1, further comprising
a first fan configured to move air within the air handler past surfaces of the first evaporator into the first zone; and
a second fan configured to move air within the passenger compartment past surfaces of the second evaporator into the second zone,
the control panel is further configured to receive manually set speeds of the first fan and speeds of the second fan.

9. A vehicle air conditioning system, comprising:
a vehicle body structure defining a passenger compartment having a first zone and a second zone;
a first sensor that detects humidity of the fresh air entering the air handler;
an air handler having a fresh air inlet positioned to draw fresh air from outside the vehicle body structure, a recirculation inlet positioned to draw air from within the passenger compartment and a recirculation door movable from a first position to a second position such that in the first position only fresh air from outside the vehicle body structure can enter the air handler and in the second position only air from the first zone enters the air handler;
a control panel configured for receiving manually set air conditioning operation settings, including settings for cooling of the first zone, settings for cooling of the second zone and position of the recirculation door; and
a controller connected to the first sensor, the recirculation door and the control panel, the controller being configured such that in response to the control panel being set to: 1) provide cooling to the second zone; 2) not to provide cooling to the first zone; 3) the recirculation door is set to provide fresh air to the air handler; and 4) the first sensor detects that the humidity of the fresh air entering the air handler is above a predetermined threshold, the controller changes the setting of the recirculation door to provide recirculated air to the air handler over-riding the manually set air conditioning operation setting of the position of the recirculation door.

10. The vehicle air conditioning system according to claim 9, further comprising:
a first evaporator located within the air handler and having an upstream side with a refrigerant expansion device and a downstream side;
a second evaporator having an upstream side with a refrigerant expansion device and a downstream side;
a compressor configured to compress refrigerant received from the downstream side of the first evaporator and the downstream side of the second evaporator;
a condenser connected to the compressor configured to dissipate heat from compressed refrigerant received from the compressor, the condenser being connected to the expansion device of the first evaporator and the expansion device of the second evaporator, and the condenser is connected to the expansion device of the first evaporator and the expansion device of the second evaporator supplying an uninterrupted flow of cooled compressed refrigerant to both the first expansion device and the second expansion device while the compressor is operating in the absence of any intervening valve or flow interruption device.

11. The vehicle air conditioning system according to claim 10, further comprising
a second air handler having an inlet that draws air from the first zone of the passenger compartment and an outlet configured to provide air to the second zone, with the second evaporator being located within the second air handler.

12. The vehicle air conditioning system according to claim 10, further comprising
a second air handler having an inlet that draws air from outside the vehicle body structure and an outlet configured to provide air to the second zone, with the second evaporator being located within the second air handler.

13. The vehicle air conditioning system according to claim 9, wherein
the first zone is a portion of the passenger compartment that includes a vehicle operators area, and the second zone is a portion of the passenger compartment for passengers.

14. The vehicle air conditioning system according to claim 9, wherein
the vehicle body structure includes a partition separating the first zone from the second zone.

15. A vehicle air conditioning system, comprising:
a vehicle body structure defining a passenger compartment having a first zone and a second zone, the first zone being a forward portion of the passenger compartment and the second zone being a rearward portion of the passenger compartment behind the first zone;
a first sensor that detects vehicle speed of the vehicle body structure;
an air handler having a fresh air inlet positioned to draw fresh air from outside the vehicle body structure, a recirculation inlet positioned to draw air from within the passenger compartment and a recirculation door movable from a first position to a second position such that in the first position only fresh air from outside the vehicle body structure can enter the air handler and in the second position only air from the first zone enters the air handler;
a control panel configured for receiving manually set air conditioning operation settings, including: a setting for cooling both the first zone and the second zone; a setting for cooling of only the first zone and not the second zone; a setting for cooling of only the second zone and not the first zone, and, settings for a plurality of positions of the recirculation door; and
a controller connected to the first sensor, the recirculation door and the control panel, the controller being configured such that in response to the control panel being set to provide cooling to only the second zone and not the first zone, the recirculation door being set to provide fresh air to the air handler and the first sensor detects that the vehicle speed is above a predetermined threshold, the controller changes the setting of the recirculation door to provide recirculated air only to the air handler over-riding the manually set air conditioning operation setting of the position of the recirculation door.

16. The vehicle air conditioning system according to claim 15, further comprising:
- a first evaporator located within the air handler and having an upstream side with a refrigerant expansion device and a downstream side;
- a second evaporator having an upstream side with a refrigerant expansion device and a downstream side;
- a compressor configured to compress refrigerant received from the downstream side of the first evaporator and the downstream side of the second evaporator; and
- a condenser connected to the compressor configured to dissipate heat from compressed refrigerant received from the compressor, the condenser being connected to the expansion device of the first evaporator and the expansion device of the second evaporator,
- the condenser being connected to the expansion device of the first evaporator and the expansion device of the second evaporator supplying an uninterrupted flow of cooled compressed refrigerant to both the first expansion device and the second expansion device while the compressor is operating in the absence of any intervening valve or flow interruption device.

17. The vehicle air conditioning system according to claim 16, further comprising
- a second air handler having an inlet that draws air from the first zone and an outlet configured to provide air to the second zone, with the second evaporator being located within the second air handler.

18. The vehicle air conditioning system according to claim 16, further comprising
- a second air handler having an inlet that draws air from outside the vehicle body structure and an outlet configured to provide air to the second zone, with the second evaporator being located within the second air handler.

\* \* \* \* \*